J. W. AYLSWORTH & E. L. AIKEN.
SOUND RECORD AND OTHER OBJECT.
APPLICATION FILED SEPT. 10, 1914.
1,151,849.  Patented Aug. 31, 1915.
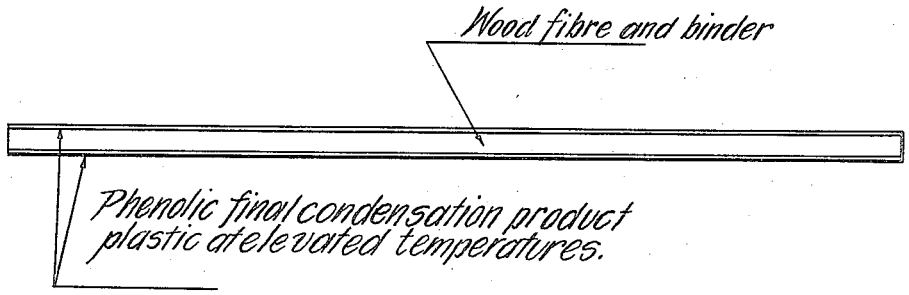

UNITED STATES PATENT OFFICE.

JONAS W. AYLSWORTH, OF EAST ORANGE, NEW JERSEY, AND EDWARD L. AIKEN, OF SPRINGFIELD, MASSACHUSETTS, ASSIGNORS, BY MESNE ASSIGNMENTS, TO THOMAS A. EDISON, INCORPORATED, OF WEST ORANGE, NEW JERSEY, A CORPORATION OF NEW JERSEY.

SOUND-RECORD AND OTHER OBJECT.

1,151,849.     Specification of Letters Patent.     Patented Aug. 31, 1915.

Original application filed August 6, 1910, Serial No. 575,981. Divided and this application filed September 10, 1914. Serial No. 861,038.

*To all whom it may concern:*

Be it known that we, JONAS W. AYLSWORTH, a citizen of the United States, and a resident of East Orange, Essex county, New Jersey, and EDWARD L. AIKEN, a citizen of the United States, and a resident of Springfield, Hampden county, Massachusetts, have invented certain new and useful Improvements in Sound-Records and other Objects, of which the following is a description.

Our invention relates to molded objects, especially flat plates, such as disk sound records, and more particularly to the disk sound record and other molded objects formed by our improved process described and claimed in our application, Serial No. 575,981, filed August 6, 1910, of which this application is a division. By our improved process, molded objects are formed of resinous refractory condensation products of phenol or equivalent substances, and formaldehyde or other material containing active methylene ($CH_2$) groups.

Our principal object is to produce as an article of manufacture various molded objects such as disk sound records, formed by our improved process, and having certain distinguishing characteristics which will hereafter be more fully pointed out.

Our process consists generally in the formation of a body or backing having a large proportion of an inert filling material incorporated therein, the formation of a surfacing layer, having a less proportion of filler or no filler, securing or forming the surfacing layer upon the body, and molding the object from the blank thus formed, while at the same time causing the reaction to ensue between the ingredients of the object or of the surface layer thereof by application of sufficient heat to form a final infusible and insoluble condensation product.

In carrying out our process, we prefer to proceed as follows:—A fusible soluble phenolic condensation product or phenol resin is formed. This is preferably the product formed by the reaction of substantially three parts of phenol to two parts of formaldehyde by molecular weights, the reaction apparently taking place according to the equation—

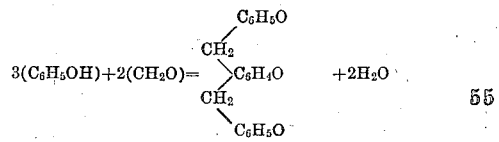

as explained in applications of Aylsworth, Serial No. 494,060, filed May 14, 1909, entitled Plastic composition and process of manufacturing the same, and Serial No. 543,238, filed February 11, 1910, entitled Phenolic condensation product and method of preparing the same, upon which applications U. S. Patents Nos. 1,102,630 and 1,020,593 respectively have been granted. Whether or not the reaction takes place according to the equation given, the resulting condensation product is fusible and soluble in alcohol and other solvents and is a solid at normal temperatures. Apparently, this product contains no free formaldehyde or other free or active methylene-containing substance, and it is permanently fusible in the sense that it cannot be transformed into an infusible final condensation product by any amount of heating with or without pressure without the addition of formaldehyde, paraformaldehyde, hexa-methylene-tetra-amin, or other hardening agent, but upon being heated together with a sufficient quantity, as 10%, of such hardening agent, a transformation takes place changing the phenol resin into a final infusible insoluble condensation product, as is explained in the applications of Aylsworth above referred to. To make the blank or body of a disk sound record or other object to be molded, we prefer to dissolve the fusible condensation product or phenol resin obtained as above described in a liquid solvent for the same, preferably alcohol. A sufficient percentage of a methylene-containing or hardening agent is then dissolved in the solvent containing the phenol resin. We prefer to make use of hexa-methylene-tetra-amin in the proportion of about 10 per cent. of the phenol resin, and this is preferably first dissolved in a sufficient amount of water and added to the solution of the phenol resin in the alcohol, since the hexa-methylene-tetra-amin dissolves more readily in water than in alcohol. Next, an inert filling body such as dry wood pulp or other filling materials, such as are described in the applications of Aylsworth above referred to, are placed in a mixing machine, and if desired, a coloring material, such as lamp black, is added to the mixture. The solution of the phenol resin and the hardening agent is then poured into the mixing machine upon the filler and the components are thoroughly mixed together. The solvent is then removed as by evaporation, the alcohol preferably being recovered and used over and over. The dried mixture resulting is then ground to uniformity and molded preferably in a hydraulic press with a suitable amount of heat, preferably about 300 degrees F., steam heat, the blank or body thus being formed. In this molding operation, the hardening reaction between the phenol resin and the hexa-methylene-tetra-amin may take place to a limited extent, although it is only necessary that the materials be sufficiently heated to coalesce in the mold to form the blank. The filling body may be used with good results in the proportion of two or three to one by weight to the phenol resin. The proportions of the filler to the binder in the final hardened product, though slightly less than the proportions given, will be approximately the same.

The surface layer for the object to be molded is preferably formed as follows:—A sufficient amount of phenol resin, together with a hardening material, preferably hexa-methylene-tetra-amin, a plasticity agent, such as described in the applications of Aylsworth above referred to, and which is preferably chlorinated naphthalene, as mono-chloro-naphthalene, are ground together, with a percentage of an inert filler less than the percentage used in the case of the mixture for the blank above described. Preferably, a percentage of the blank mixture itself is used for incorporation with the other ingredients to provide the filling body. We have obtained good results with the following proportions:— phenol resin 100 parts; blank mixture 10 to 40 parts; mono-chloro-naphthalene 15 to 30 parts; hexa-methylene-tetra-amin 10 to 12 parts. Preferably, the hexa-methylene-tetra-amin in perfectly dry condition is first ground through a paint mill together with the chlorinated naphthalene, which is rendered liquid if necessary by heat. This operation results in the formation of a paste. The phenol resin is then ground and the desired amount of the blank mixture stirred into the same after the grinding, together with the paste containing the hexa-methylene-tetra-amin and the chlorinated naphthalene. A damp powder results. The mixture thus formed is preferably now subjected to a more uniform mixing operation by running the same between heated mixing rolls. The mixture is then preferably formed into sheets by passing the same through heated calender rolls, the heat of the rolls being sufficient to cause the formation of the sheet, but not to cause the reaction between the ingredients. The surface layer in the form of sheets is then fixed to the blank in any suitable manner. In the case of a plate to be molded, such as a disk sound record, the heated blank together with a surfacing sheet is passed between warm rolls. In the case of a disk sound record which it is desired to mold upon both sides, a surface layer is secured to each side of the blank by passing the heated blank with the surfacing sheets on both sides of the same through the rolls. The plasticity agent referred to renders the surface sufficiently plastic at elevated temperatures to be pressed or molded. The blank is now ready to be molded and is placed in a suitable mold, heated sufficiently, and pressed preferably in a hydraulic press, the reaction ensuing between the ingredients of the composition while in the press to harden the molded object into a final infusible and insoluble product, the body and the surface layer being one homogeneous mass. Upon cooling, the finished molded object may be removed from the mold.

We prefer to use hexa-methylene-tetra-amin as a hardening agent for reasons given in applications of Aylsworth, Serial No. 543,236 and 543,238, upon which U. S. Patents Nos. 1,146,388 and 1,020,593 respectively have been granted, although para-formaldehyde or other methylene-containing substances may be used. During the final reaction, there is no evolution of dissociation gases, and counteracting pressure, accordingly, need not be used to prevent gassing in the composition, pressure being used only for the purpose of giving the object the desired form. In the case of various objects, it will not be necessary to perform the entire reaction within the mold during the shaping of the object, which may be transformed into its final infusible and insoluble form subsequently. In the case of various molded objects having exceedingly delicate surfaces, particularly sound records, the best result is attained by performing the final hardening reaction while the object is being pressed in the mold. The filling body used may be a final infusible phenolic hard condensation product ground fine and mixed with the other ingredients, in place of wood pulp or other organic or inorganic fillers. This is mentioned in applications of Aylsworth, Serial No. 543,236, above referred to, and Serial No. 575,970, filed August 6, 1911, upon which last named application U. S. Patent No. 1,102,631 has been granted.

In the drawing forming part of this specification is shown a side elevation of one embodiment of my invention, the materials employed in the said embodiment being described on the drawing.

It is obvious that our invention is not limited to the particular details described, but that the latter may be modified within the scope of the appended claims without departing from the spirit of the invention. The body of the record or other object formed should upon molding make a homogeneous mass with the surface layer, to obtain the best results, but for some purposes the body may be formed of an inert filler and a binder other than a phenolic condensation product, particularly if the body is of material having substantially the same coefficient of expansion as the surface layer which in such case is in the nature of a veneer applied to the backing.

Having now described our invention, what we claim and desire to protect by Letters Patent is as follows:

1. As a new article of manufacture, a sound record or blank comprising a body of suitable material and a surface layer containing a final hardened phenolic condensation product having incorporated therewith a substance which renders the surface layer sufficiently plastic at elevated temperatures to be pressed or molded, substantially as described.

2. As a new article of manufacture, a sound record or blank comprising a body containing a filler and a binding agent and a surface layer containing a final hardened phenolic condensation product having incorporated therewith a substance which renders the surface layer sufficiently plastic at elevated temperatures to be pressed or molded, substantially as described.

3. As a new article of manufacture, a sound record or blank comprising a body of suitable material and a surface layer containing a final hardened condensation product formed from a permanently fusible phenol resin and a material containing an active methylene group, substantially as described.

4. As a new article of manufacture, a sound record or blank comprising a body of suitable material and a surface layer containing a final hardened condensation product formed of a phenol resin and a material containing an active methylene group, said product having a plasticity agent incorporated therewith, substantially as described.

5. As a new article of manufacture, a sound record or blank comprising a body containing a filler and a phenolic binding agent therefor and a surface layer containing a phenolic condensation product, substantially as described.

6. As a new article of manufacture, a sound record or blank comprising a body containing a condensation product of a phenol and a substance containing the methylene radical, and a surface layer containing a final hardened phenolic condensation product having a plasticity agent incorporated therewith, substantially as described.

7. As a new article of manufacture, a sound record or blank comprising a body containing a final hardened condensation product formed of a phenol and a substance containing an active methylene group, and a surface layer containing a final hardened phenolic condensation product having a plasticity agent incorporated therewith, substantially as described.

8. As a new article of manufacture, a sound record or blank comprising a body containing a filler and a binder formed of a condensation product of a phenol and a substance containing an active methylene group, and a surface layer containing a final hardened phenolic condensation product having a plasticity agent incorporated therewith, substantially as described.

9. As a new article of manufacture, a sound record or blank comprising a body containing a filler and a binder formed of a final hardened condensation product of a phenol and a substance containing an active methylene group, and a surface layer containing a final hardened phenolic condensation product having a plasticity agent incorporated therewith, substantially as described.

10. A flat sound record or other object having a body of suitable material and a surface layer containing a hardened phenolic condensation product on both sides or faces of said body, said product having incorporated therewith a substance which renders the surface layer sufficiently plastic at elevated temperatures to take a clear impression from a sound record matrix, substantially as described.

11. A flat sound record or other object having a body containing a filler and a binding agent therefor and a surface layer containing a hardened phenolic condensation product on both sides or faces of said body, said product having incorporated therewith a substance which renders the surface layer sufficiently plastic at elevated temperatures to take a clear impression from a sound record matrix, substantially as described.

12. A flat sound record or other object having a body containing a phenolic filler and a binding agent therefor and a surface layer containing a hardened phenolic condensation product on both sides or faces of said body, said product having incorporated therewith a substance which renders the surface layer sufficiently plastic at elevated temperatures to take a clear impression from a sound record matrix, substantially as described.

13. A flat sound record or other object having a body containing a hardened phenolic condensation product and a filler and a surface layer containing a hardened phenolic condensation product on both sides or faces of said body, said product having incorporated therewith a substance which renders the surface layer sufficiently plastic at elevated temperatures to take a clear impression from a sound record matrix, substantially as described.

14. As a new article of manufacture, a sound record or blank comprising a body containing a filler of wood fiber and a binder therefor containing a phenolic condensation product, and a surface layer for said body containing a hardened phenolic condensation product, said surface layer being sufficiently thermo plastic to take when heated a clear impression from a sound record matrix, substantially as described.

15. As a new article of manufacture, a sound record or blank comprising a body containing a filler of wood fiber and a binder therefor containing a phenolic condensation product, the wood fiber being in excess of the binder, and a surface layer containing a hardened phenolic condensation product, said surface layer being sufficiently thermo plastic to take when heated a clear impression from a sound record matrix, substantially as described.

16. As a new article of manufacture, a sound record or blank comprising a body containing a filler of wood fiber and a binder therefor containing a hardened phenolic condensation product, the wood fiber being in excess of the binder, and a surface layer containing a hardened phenolic condensation product, said surface layer being sufficiently thermo plastic to take when heated a clear impression from a sound record matrix, substantially as described.

17. As a new article of manufacture, a sound record or blank comprising a body containing a filler of wood fiber and a binding agent and a surface layer containing a final hardened phenolic condensation product having incorporated therewith a substance which renders the surface layer sufficiently plastic at elevated temperatures to be pressed or molded, substantially as described.

18. As a new article of manufacture, a sound record or blank comprising a body containing a filler of wood fiber and a resinous binding agent and a surface layer containing a final hardened phenolic condensation product having incorporated therewith a substance which renders the surface layer sufficiently plastic at elevated temperatures to be pressed or molded, substantially as described.

19. As a new article of manufacture, a sound record or blank comprising a body containing a filler and a binding agent, the filler being in excess of the binding agent, and a surface layer containing a final hardened phenolic condensation product having a plasticity agent incorporated therewith, substantially as described.

20. As a new article of manufacture, a sound record or blank comprising a body containing a filler of wood and a binding agent, the filler being in excess of the binding agent, and a surface layer containing a final hardened phenolic condensation product having a plasticity agent incorporated therewith, substantially as described.

This specification signed by me, the said JONAS W. AYLSWORTH, and witnessed on my behalf the 2nd day of September, 1914, and signed by me, the said EDWARD L. AIKEN, and witnessed on my behalf the 3rd day of September, 1914.

JONAS W. AYLSWORTH.

Witnesses:
FREDERICK BACHMANN,
MARY J. LAIDLAW.

EDWARD L. AIKEN.

Witnesses:
E. GEO. MOSELEY,
GEORGIANNA DROLETTE.